Nov. 10, 1964  A. J. GOUBA  3,156,006
LINK CUTTING MACHINE
Filed July 2, 1962  5 Sheets-Sheet 1

INVENTOR.
ALFRED J. GOUBA
BY
Bean, Brooks, Buckley & Bean
ATTORNEYS

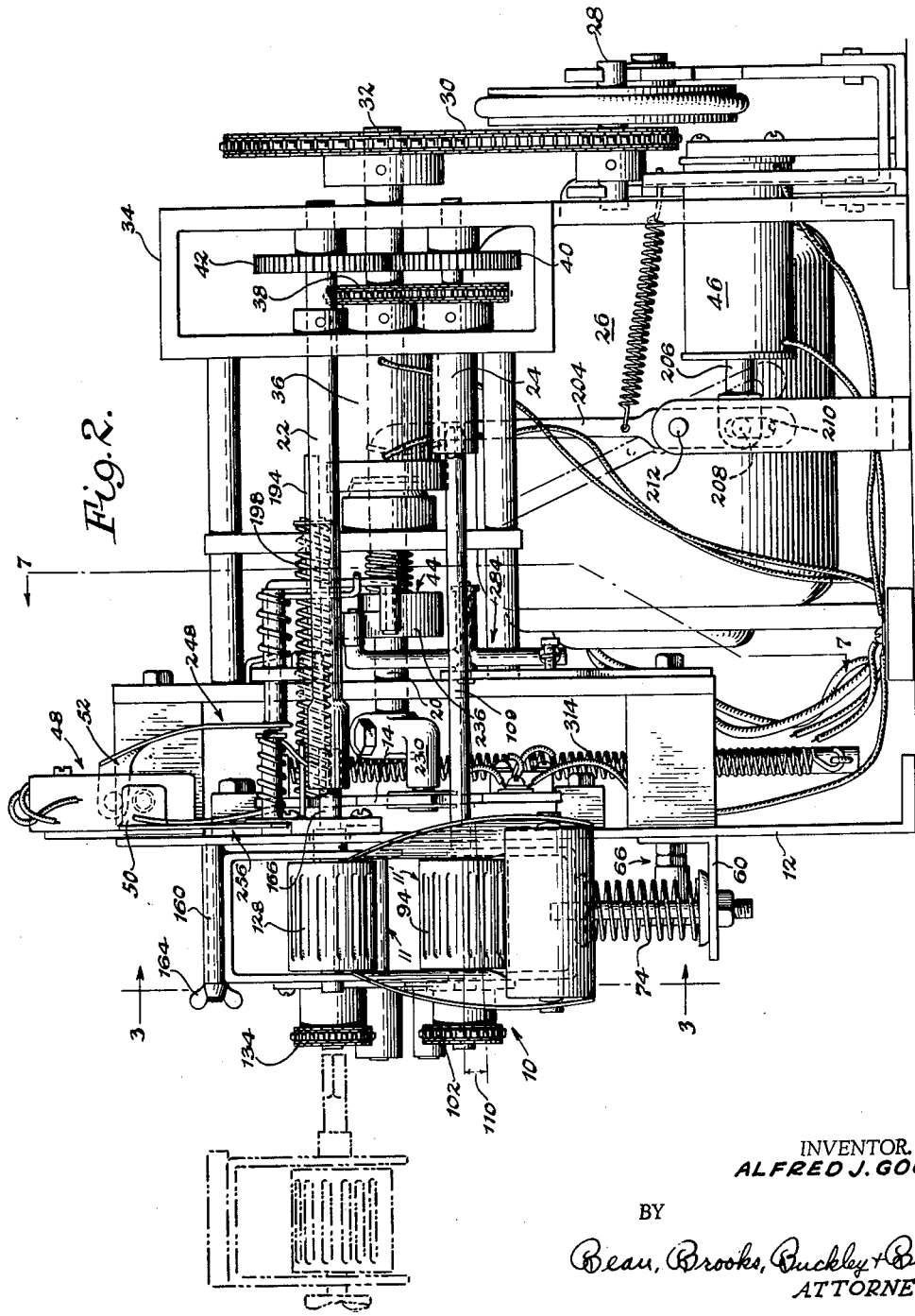

Nov. 10, 1964  A. J. GOUBA  3,156,006
LINK CUTTING MACHINE
Filed July 2, 1962  5 Sheets-Sheet 3
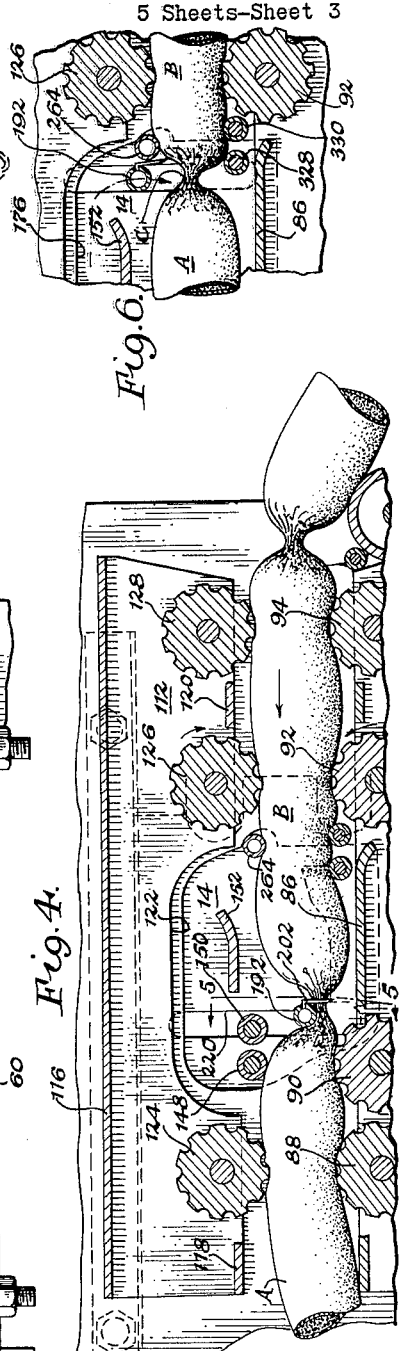
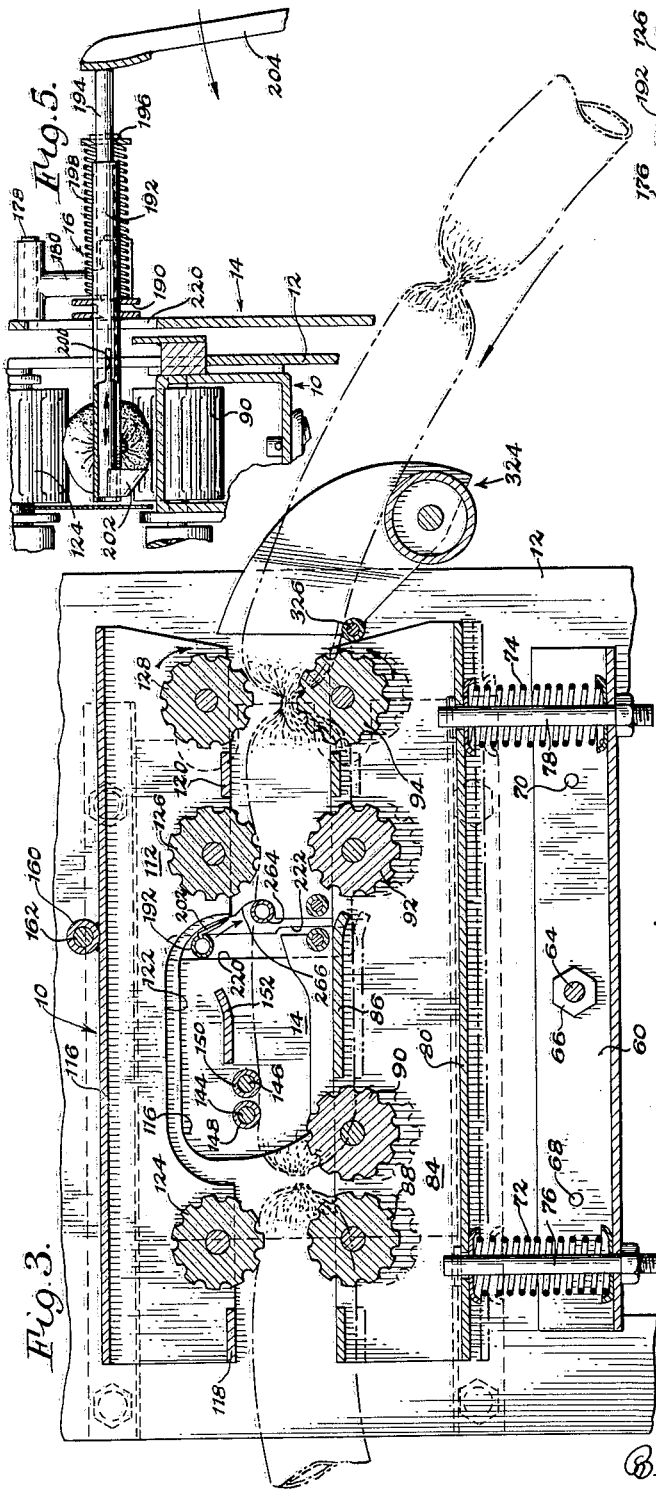
INVENTOR.
ALFRED J. GOUBA
BY
Beau, Brooks, Buckley & Beau
ATTORNEYS

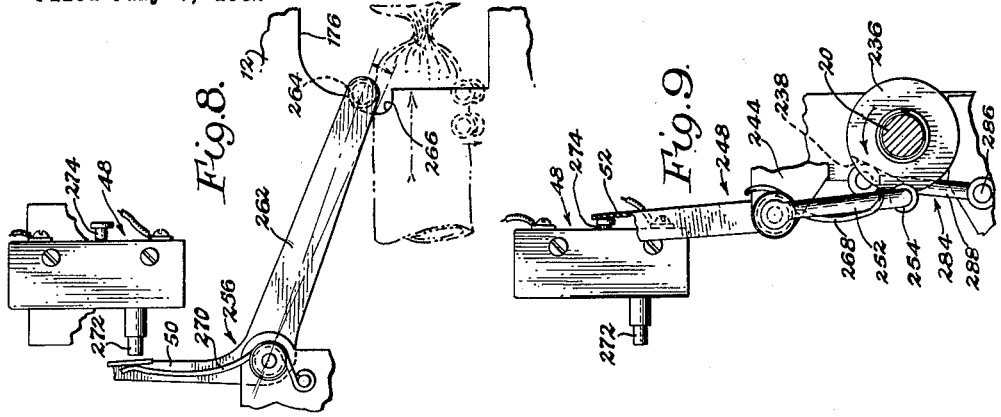
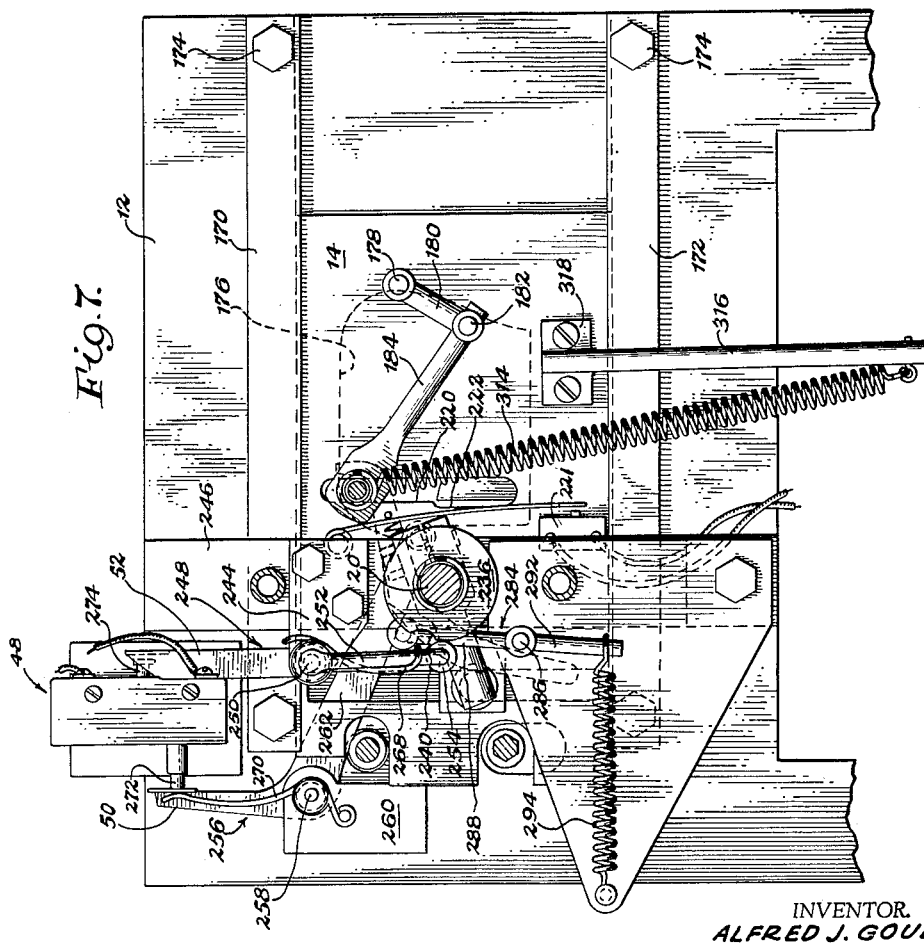

Nov. 10, 1964    A. J. GOUBA    3,156,006
LINK CUTTING MACHINE
Filed July 2, 1962    5 Sheets-Sheet 5
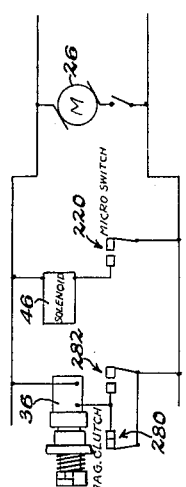
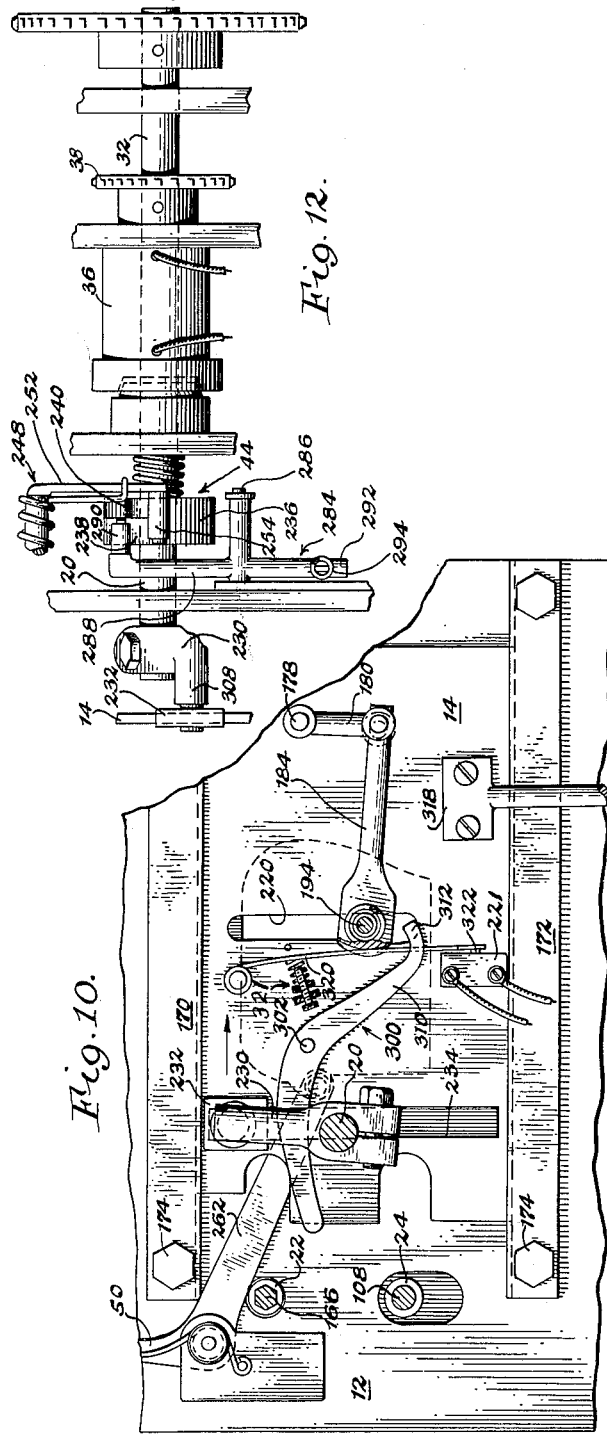
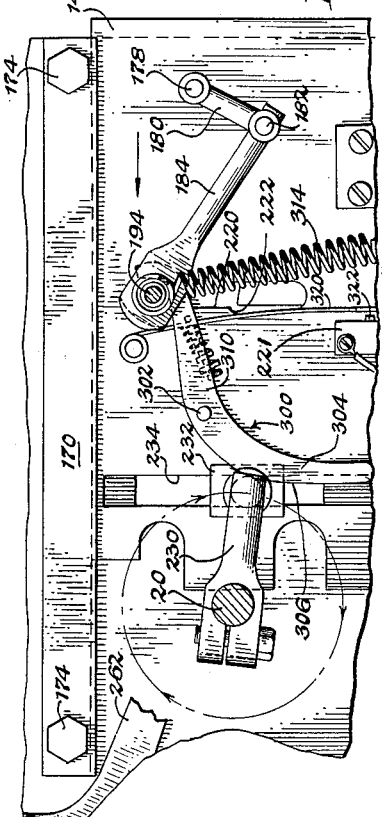
INVENTOR.
ALFRED J. GOUBA
BY
Bean, Brooks, Buckley + Bean
ATTORNEYS

United States Patent Office 3,156,006
Patented Nov. 10, 1964

3,156,006
LINK CUTTING MACHINE
Alfred J. Gouba, 339 Atlantic St., Sloan 12, N.Y.
Filed July 2, 1962, Ser. No. 206,926
11 Claims. (Cl. 17—1)

This invention relates in general to a mechanism for dividing a chain of joined articles into individual links or lengths thereof.

In particular, the present invention is directed to a machine particularly adapted for cutting up a chain of sausages, wieners and the like into individual links, the mechanism being characterized by a simplicity of construction which is still capable of performing the aforesaid function at high speed.

Of primary concern in connection with the present invention is the provision of a machine of the character described which utilizes mechanism for advancing the chain of joined articles at high speed and which incorporates, in conjunction with such advancing means, a mechanism which seeks out and senses the region of juncture between two adjacent joined articles to actuate the movement of a reciprocable carriage which carries cutter mechanism which drops down into position between the joined articles and which is actuated in timed relationship to sever the joined articles.

Another object of the present invention is to provide a machine as aforesaid wherein the mechanism for advancing the chain of joined articles is characterized by its simplicity and inherent effectiveness, the mechanism being so constructed and arranged as to readily accommodate for dismantling and cleaning operations.

A further object of this invention is to provide a machine of the nature specified which is capable of accurately and quickly performing the above noted severing actions and wherein the mechanism is particularly characterized by its capability for accommodating to various lengths of links so that the cutting or severing operation is assured of its perforance at the precise and proper position without either damage to the articles or jamming of the mechanism involved.

Still another object of the present invention resides in the construction of the advancing means wherein the same is characterized by the utilization of a pair of sections which are normally spaced apart a distance less than the width or thickness of the articles to be processed and wherein at least one of such sections is yieldably mounted to accommodate for the thicker articles and to assure a good frictional grip thereupon for proper and high speed advancement thereof, the invention also being directed to simple yet effective means for permitting effective drive to be maintained to such yieldably movable section.

Another object of this invention resides in the provision of a machine for severing a chain of joined articles into individual or separate links which employs the principle of means for continuously advancing the articles along a given course and for periodically effecting reciprocation of a carriage mechanism alongside such course in response to the presence of a region of joining between two adjacent articles and wherein the carriage assembly carries knife means timed by the reciprocation of the carriage assembly to effect a proper cutting action in the region between the joined articles.

Other objects and advantages of the invention will appear from the description hereinbelow and the accompanying drawing wherein:

FIG. 2 is a side elevational view of the assembly shown in FIG. 1, illustrating details of the drive mechanism, further details of the advancing means and also a dotted line position of the upper section of the advancing means and illustrating therein how the same may be readily removed from the machine for cleaning or other purposes;

FIG. 3 is a vertical section taken through the advancing means as indicated by section line 3—3 in FIG. 2 and illustrating details of its construction;

FIG. 4 is a view similar to FIG. 3 but showing the knife assembly in operative position and having just severed two adjacent joined articles;

FIG. 5 is a vertical section taken substantially along the plane of section line 5—5 in FIG. 4 showing details of the knife mechanism and a portion of its actuating means and omitting certain parts for the sake of clarity;

FIG. 6 is a fragmentary view taken vertically through the advancing means and showing the knife assembly just moving into operative position;

FIG. 7 is a vertical section taken substantially along the plane of section line 7—7 in FIG. 2 and illustrating details of the stop motion mechanism, a part of the control assembly for the one-revolution clutch and details of the carriage assembly including the knife means carried thereby;

FIG. 8 is a diagrammatic view illustrating the sensing means for actuating the one-revolution clutch;

FIG. 9 is a diagrammatic view showing a portion of the stop motion device and the clutch interlock associated therewith;

FIG. 10 is a view similar to FIG. 7 but with some parts omitted showing the carriage assembly at the time of knife actuation;

FIG. 11 is a view similar to FIG. 10 but showing the carriage mechanism starting its return motion;

FIG. 12 is a fragmentary view of the drive train illustrating the one-way clutch mechanism and the stop motion device associated therewith; and FIG. 13 is a schematic diagram illustrating electrical control connections associated with the invention.

Figure 1:
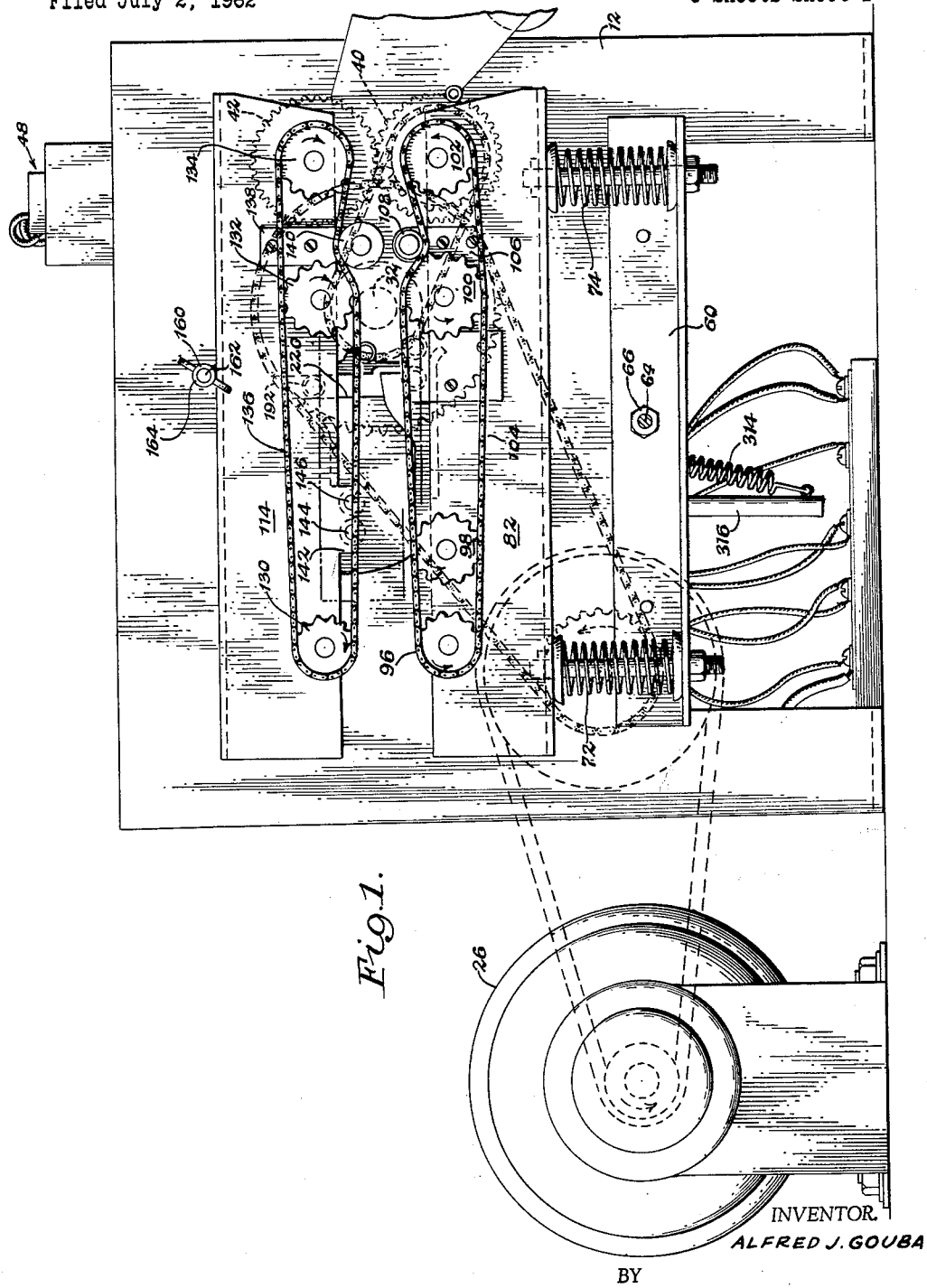
FIG. 1 is a front elevational view of a construction embodying the principles of the present invention and illustrating the means for advancing the chain of articles to be separated.

Referring at this time more particularly to FIG. 2, wherein the general arrangement of component parts is best seen, the reference character 10 designates in general the advancing means or conveyor mechanism for moving and conveying a chain of joined articles or links in endwise relationship through the machine, through a given course and path defined by such advancing means. 10. To this end, the advancing means 10, as will hereinafter be more clearly seen, comprises an upper section 11 and a lower section 11' between which the chain of articles are sandwiched and moved as aforesaid. The frame for the machine as shown in the drawing is of composite or built up form although it is to be understood that an integral or otherwise sectionalized housing or frame may be provided. However, in the specific embodiment shown, the frame includes a main upright portion 12 upon one side of which is mounted the aforementioned advancing means 10 and on the opposite side of which is mounted a reciprocable carriage assembly, see particularly FIG. 7 for example. The carriage assembly 14 mounts thereon a knife assembly indicated generally by the reference character 16, see particularly FIG. 5 and, as will hereinafter be more clearly apparent, the knife assembly or means 16 is so carried and actuated as to be first positioned between adjacent joined articles and then actuated to sever the joined portions thereof.

Drive for the reciprocation of the carriage 14 is achieved by means of an actuating shaft 20 as shown in FIG. 2, and an additional pair of drive shafts 22 and 24 are provided for imparting drive to the upper and lower sections of the advancing means 10. A common drive motor 26 is utilized which is coupled by suitable drive means such as the belt and pulley arrangement shown to impart rotation to an intermediate shaft 28 and from thence, as by the chain and sprocket arrangement 30 to the main drive shaft member 32. The main drive shaft 32 is supported in suitable frame section 34 or its equivalent and is selectively coupled, by means of a magnetic one-revolution clutch assembly 36 to the aforementioned actuating shaft 20 and the main shaft 32 is also coupled as by means of the chain 38 to the previously mentioned drive shaft 24 for the lower advancing means section. The drive shaft 24 has a gear 40 fixed thereto which meshes with a similar gear 42 fixed to the drive shaft 22 so that these two shafts 22 and 24 rotate at the same speed but in opposite directions to impart the requisite drive, as is hereinafter more fully described, to the upper and lower sections of the advancing means. The clutch mechanism 36 is preferably of the magnetic type and will couple the shaft 20 to the main shaft 32 whenever energized or actuated. To sharply delineate the point at which the cessation of drive to the shaft 22 is achieved and coupled with the control mechanism for actuation of the clutch 36, there is provided a stop motion device indicated generally by the reference character 44 in FIG. 2, which stop motion device accurately positions the carriage 14 at the end of each cycle of its operation. Also shown in FIG. 2 is a solenoid device 46 which is coupled to suitable linkage hereinafter more particularly described so as to impart the actual severing action achieved by the knife means 16. Lastly, for the general description, FIG. 2 illustrates a microswitch arrangement indicated generally by the reference character 48 which is mounted upon the frame or housing of the machine and which is of the compound type, that is, there are two switches incorporated therein disposed in electrically parallel relationship and respectfully actuated by the fingers 50 and 52, the former of which initiates energization of the clutch 36 and the latter of which provides a holding circuit therefor and also operates to cause cessation of energization of the clutch 36, the finger 52 being tied in with the stop motion device 44 as hereinafter described. The finger 50 is actuated by a sensing means which detects a predetermined positional relationship of the region of juncture between two adjacent joined articles next to be severed.

From the above broad and general description, it will be understood that as the chain of articles are advanced or conveyed by the means 10 past an opening in the frame element 12 through which the knife means 16 is operative, the carriage 14 will remain motionless until such time as the sensing means which operates the finger 52 detects the predetermined positional presence of the region of juncture between the next two articles to be separated and thus starts reciprocation cycle of the carriage 14. The carriage 14 in its operation serves to first position and cause actuation of the knife means 16 whereby the severing operation is achieved while the knife means is moving at or near the same linear velocity as the articles being separated, whereafter the carriage 14 is returned to its initial position and remains motionless until the next cycle is initiated by the sensing means as aforesaid.

One aspect of the present invention which releates to the specific structural details as set forth in the drawing concerns the construction and operation of the advancing means 10. As can be seen best in FIGS. 1 and 3, the lower section 11' of the advancing or conveying means 10 includes a suitable support member 60 which is fixedly secured to the main support member 12 as by stud 64 carried by the frame member and a suitable nut member 66 threadedly engaged therewith, there being suitable locating means such as the pins 68 and 70 interacting between the member 60 and the frame 12 to locate the two relative to each other. The support member provides a resilient mount for the lower section proper by virtue of the spring members 72 and 74 and associated guide pins 76 and 78, the guide pins extending through the bottom wall 80 of the lower section housing substantially as is shown and the housing itself being movable as between the full and dotted line position shown in FIG. 3. The housing 80 is preferably of generally rectangular construction, being provided with the outer side wall 82 shown in FIG. 1, the inner side wall 84 as shown in FIG. 3 and which walls are joined by the previously mentioned bottom wall portion 80. The top wall 86 is provided with a number of openings to permit the several rollers 88, 90, 92 and 94 to project therethrough as is shown in FIG. 3, each roller being mounted upon a drive shaft therefor which is journalled within the inner and outer side walls of the housing assembly. The several drive shafts for the various rollers 88, 90, 92 and 94 project a substantial distance outboard of the outer wall 82 of the lower section of the advancing means and each is provided thereon with a sprocket such as those indicated by reference characters 96, 98, 100 and 102 as shown in FIG. 1. A common endless chain element 104 is trained about these several sprockets and an adjustable bracket 106 mounted on the outer wall 82 of the housing carries an idler roller 108 for adjusting the tension on this chain element 104 as will be readily apparent. The drive shaft for the sprocket 102 and the corresponding roller 94 is in the form of a stub shaft 109 which, as can be seen in FIG. 2, projects a substantial distance inboard of the main frame member 12 into slide-drive relationship with the drive shaft 24. It is a particular feature of the present invention that the stub shaft 108 is of substantial length and it is preferred that its remote end is slightly rounded or that the coupling connection between the stub shaft 108 and the drive shaft 24 otherwise be of such character as to permit angular deviation in a vertical direction of the stub shaft 108 relative to the drive shaft 24, as is indicated by the deflection arrow 110 in FIG. 2. The reason for this arrangement is to permit the lower section of the advancing or conveying means to ride up and down by virtue of the spring mounting means therefor as aforesaid to accommodate for the thicknesses of the articles being transported. In this connection, it will be appreciated, as hereinafter more particularly set forth, that the upper section of the advancing means is fixed relative to the frame 12 and the normal spacing between the upper and lower section is less than the thicknesses of the articles being advanced so that a good gripping action is obtained thereon for positively advancing the same through the mechanism.

The upper section of the conveying or advancing means 10 can be best seen in FIGS. 1, 3 and 4 and will be seen to include a housing constructed in generally similar fashion to the housing of the lower section. For example, the housing of the upper section includes an inner side wall 112 as shown in FIGS. 3 and 4, an outer side wall 114 as shown in FIG. 1, a top wall 116 interconnecting the inner and outer side walls and a bottom wall or, more appropriately, cross bracing bottom members 118 and 120 as shown in FIGS. 3 and 4. The inner side wall 112 is cut away in the region indicated by reference character 122 to provide clearance for the movement and cycling of the knife mechanism as will hereinafter appear and there are a series of rollers 124, 126 and 128 carried by shafts journalled between the inner and outer side walls and each extending in outboard relation from the outer side wall whereupon the sprockets 130, 132 and 134 as shown in FIG. 1 are mounted. As in the case of the lower section, an endless chain member 136 is trained about all of these various sprockets and an adjustable bracket 138 mounted on the outer side wall 114 carries the take-up roller 140 as shown in FIG. 1. To complete the description of the upper section, it will be noted that the outer wall 114 is provided with downwardly projecting extension 142 which fixedly carries a pair of rods 144 and 146 in inwardly cantilevered relationship thereto, such rods journalling thimbles or rollers 148 and 150 thereon, see particularly FIG. 3, serving as guide means for the chain of articles progressing through the advancing means. Additionally, the outer wall 114 carries a guide plate member 152, see particularly FIG. 3, in a fashion similar to the rods 144 and 146 and positionally ahead of such rods whereby such member 152 acts as a deflector to guide the loose end of an article between the space provided between the rollers 148 and 150 and the underlying roller 90.

The top wall 116 of the upper section is provided with a tube 160 rigidly affixed thereto and which receives a stud 162 fixed to the outer surface of the frame member 12, a wing nut 164 being utilized to secure the entire upper section to the frame 12. It will be appreciated that the inner surface of the inner wall 112 may be provided with alignment pins or dowels cooperating with the frame element 12 to maintain alignment therebetween and, with such an arrangement it will be manifest that the single locking member 164 will suitably secure the upper section to the frame 12. At the same time, it will be appreciated from a study of FIG. 2 that the shaft which carries the roller 128 and associated sprocket 134 is in the form of a stub shaft indicated by reference character 166 which is slip-fitted into driven engagement with the drive shaft 22. Therefore, the aforementioned tube 160 can be merely withdrawn from its associated stud 162 and the entire assembly withdrawn from the outer face of the main support member 12 for cleaning, repair or the like. At the same time, it will be seen that this removal of the upper section will expose the lower section for ready cleaning, repair, replacement or the like, but the lower section, too, is easily removed from the assembly by removing the fastening means 66 to release the support 60 from its securement to the outer face of the main support member 12.

Turning now to FIG. 7, it will be noted that the inner side of the support member 12 has rigidly affixed thereto a pair of spaced horizontal guide rails 170 and 172, securement being effected as by fasteners 174 as shown. The opposed inner faces of these rails 170 and 172 are provided with suitable grooves slidably and guidably receiving the upper and lower corresponding edges of the carriage assembly 14, which carriage assembly in the specific embodiment shown is simply in the form of a generally rectangular plate mounted for the aforesaid reciprocatory motion relative to the frame 12. From FIG. 7, it will also be apparent that the frame member 12 is provided with an opening 176, the upper margin of which corresponds generally to the contour of the cutaway 122 in the inner wall of the upper section of the advancing or conveying means. The aforementioned knife means is mounted on the carriage 14 by means of a pin 178 which rotatably carries a depending link member 180 which is, in turn, pivotally coupled by pin 182 to a rod member 184 which joins with the previously mentioned knife mechanism 16. As can be seen best in FIG. 5, the arm 184 may be bifurcated to provide a groove 190 at its point of juncture with the tube 192 rigidly affixed thereto and extending on opposite sides thereof. The tube carries a rod 194 reciprocably mounted therewithin and which rod 194 extends beyond the inner end of the tube 192 as shown and carries thereon a fixed abutment or seat member 196 against which one end of spring 198 bears, the opposite end of the spring being engaged against the inner face of the bifurcated end of the arm 184. The outer end of the sleeve or tube 194 is provided with an elongate slot 200 for guiding the knife element 202 which is fixed to the rod 194 and which is movable from an innermost position to an outermost position as is shown in FIG. 5. The spring 198 normally maintains the knife 202 in retracted position whereas the actuating lever 204 shown in FIG. 5 is operative to engage against the inner end of the rod 194 and effect reciprocation of the knife 202 to its outermost extended position, whereafter released by the actuating lever 204 will permit the spring 198 to return the knife 202. The aforementioned solenoid 46 operates the actuating lever 204 in a manner which will be apparent from a study of FIG. 2. In FIG. 2, it will be seen that the solenoid 46 is provided with an armature 206 having a vertical loss motion pivotal connection as by the pin 208 and an associated slot 210 in the lower end of the actuating lever 204 so that when the armature 206 is retracted within the solenoid assembly when such solenoid assembly is energized, the lower end of the actuating lever 204 will be moved to the right in FIG. 2 about the axis of pivot pin 212 so as to effect the aforementioned severing action of the knife 202. The carriage 14 carries a micro-switch member 221 which, as hereinafter described, will effect the timed and proper actuation of the knife assembly.

The carriage plate 14 is provided with an elongate slot 220 which guidably receives the tube 192 of the knife assembly and the lower end of this slot is widened as at 222 as may be seen for example in FIGS. 3, 7 and 11, the purpose of this widened portion being presently apparent.

Referring now more particularly to FIGS. 10, 11 and 12, it will be seen that the actuator shaft 20 carries a pitman arm 230, the free end of which pivotally carries a crosshead member 232 which is guidably and slidably received in the transverse elongate slot 234 in the carriage plate 14. Thus, if the actuator shaft is driven through one complete revolution, the carriage plate 14 will be reciprocated from its initial point to a point of maximum travel and thence back to the initial point. The clutch assembly 36, when energized, causes the actuator shaft 20 to be coupled directly to the drive shaft 32 and the associated stop motion mechanism 44 assures that the actuator shaft 20 is rotated each time only through one complete revolution. Therefore, the clutch 36 taken in conjunction with the stop motion assembly 44 forms a one-revolution clutch assembly to impart a periodic cyclic motion to the carriage 14. The stop motion device may be in the form of a cam 236 fixed to the actuator shaft 20 and provided at one point thereon with a flat 238 and a recess 240 thereadjacent, see particularly FIGS. 7, 9 and 12. Mounted on a suitable bracket 244 on the frame member 246 is a bell crank assembly indicated generally by the reference character 248, the upper portion of which forms the aforementioned finger 52 for actuating one of the switches of the switch assembly 48. The intermediate portion of the bell crank 248 is offset and rotatably received in the bracket 244 so that the bell crank assembly pivots about the axis 250 as will be seen in FIG. 7. The lower portion or arm 252 of the bell crank assembly 248 carries at its extremity a laterally offset roller member 254, see particularly FIG. 12, which is adapted to ride on the circular outer surface of the cam 236 and ultimately rest within the recess 240.

A second bell crank 256, see particularly FIG. 7, is pivotally mounted as by pin 258 in a suitable frame attached bracket 260, the upper arm of this bell crank 256 being the aforementioned finger or arm member 50 for actuating the other switch of the micro-switch assembly 48. The lower arm 262 of the bell crank 256 carries at its extremity a laterally projecting sensing finger 264 which projects through the frame member 12, the arm 262 being located between the carriage plate 14 and the frame 12, and ride within the notch 266 of the opening 176 in the frame 12, see particularly FIG. 8. Both the bell crank 248 and the bell crank 256 are normally urged by suitable spring means 268 and 270 as shown in FIG. 7 to cause their respective fingers 52 and 50 to engage and operate the associated micro-switch actuator buttons 272 and 274. As can be seen from FIG. 13, the contacts of the micro-switch 280 are held closed in response to the associated actuator member 272 being depressed by the finger 50 whereas the contacts of the micro-switch 282 are held open when the associated actuator member 274 is depressed under the action of the finger 52. Thus, when the finger 264 rides down, under the action of the spring 270 into the space between two adjacent joined articles as is shown in FIG. 6, the micro-switch 280 will be closed to actuate the clutch 36. As soon as the clutch is actuated, the shaft 20 starts to move and immediately the roller 254 is cammed up onto the cylindrical outer surface of the cam 236, that is out of the recess 240, to release the actuator 274 and permit the micro-switch 280 to close. This situation will prevail until the actuator shaft 20 has made a complete revolution and the roller 254 is disposed once again within the recess 240, at which time the micro-switch 282 will be urged to open position once again, the micro-switch 280 still being in open position since the sensing finger 264 will not as yet have been permitted to drop once again into the region of juncture between the next two adjacent joined articles, but will, instead, still be in the raised position as for example as shown in FIG. 4 of the drawing.

To insure that the inertia of the system will not carry the cam 236 and the shaft 220 past the point at which the roller 254 is received within the recess 240, a braking action is obtained by virtue of a bell crank 284, see particularly FIG. 12, pivotally mounted upon the frame as by the pin 286 and including an upper arm portion 288 having a laterally projecting brake roller or finger 290 which rides on the outer surface of the cam is adapted to engage the flat 238 to cause a braking action as will be readily apparent. The lower arm 292 of the bell crank 284 is connected to a spring device 294 normally urging the brake finger 290 into engagement with the cam 236.

To synchronize the action of the knife assembly with the movement of the carriage 14, a bell crank 300 is pivotally mounted as by a pin 302 on the carriage 14, see particularly FIGS. 10 and 11. The arm 304 of the bell crank 300 is provided with an upper wear surface 306 which extends beneath the lateral offset 308, see particularly FIG. 12, of the pitman arm assembly 230 for imparting reciprocatory motion to the carriage 14. The other arm 310 of the bell crank 300 is provided with a hooked end portion 312 which rides beneath the sleeve 192 of the knife assembly. Thus, when the actuator shaft is in the at rest position, and the pitman arm is substantialy horizontally disposed and projecting to the left, the bell crank 300 will be in such position as to urge the knife assembly, by contact of the hooked end portion 312 with the sleeve 192, in the fully raised position wherein it is closely adjacent the upper extremity of the elongate transverse slot 220 in the carriage 14. As the carriage approaches the approximate mid-point of its travel, wherein the parts will be in position substantially as is shown in FIG. 10, it will be appreciated that the bell crank 300 will permit the tube 192 to seek its lowest level under the action of the spring member 314, see particularly FIGS. 7 and 11, which normally exerts a downward force upon the knife assembly. The spring 314 may be anchored to the carriage 14 in any convenient manner such as, as shown in FIG. 7, by the anchoring rod 316 attached as by bracket 318 to the carriage assembly 14. As previously mentioned, the solenoid 46 causes actuation of the knife mechanism and in order to properly time the actuation of the knife, the previously mentioned switch 220 is utilized to control energization of the solenoid 46. A spring finger 320, as shown in FIGS. 10 and 11, is adapted to close the normally open switch 220 by engagement with the actuator 322 for such switch. As the bell crank 300 permits the knife assembly to drop down into position, it will be appreciated that when the knife assembly is at or near its lowermost position, by virtue of the fact that the carriage 14 is substantially in the mid-point of its reciprocation range, its velocity will be greatest and the parts are so arranged that the carriage is moving slightly faster at this point than the articles being conveyed by the advancing means. This will cause the tube 192 of the knife mechanism to ride against the trailing end of the forward article and, due to the presence of the enlarged portion 222 of the slot 220 within which the tube 192 rides, as soon as the above mentioned action occurs, the tube will bear against the spring 320 to engage the actuator 322 and thus close the switch 220 against the action of adjusting spring mechanism 321. Consequently, actuation of the knife blade is prevented until such time as the knife assembly is properly positioned. After the severing action takes place, it will be appreciated that the bell crank 300 will raise the knife assembly, see particularly FIG. 11, and such raised position will be maintained until the next cycle of operation is initiated.

During operation of the machine, it will be appreciated that a chain of joined links or articles are fed into the advancing means by first forcing the chain into engagement between the rollers 94 and 128. An entrance chute and guide assembly 324 may be pivotally attached as at 326 to the machine for proper guiding and supporting of the chain before it enters the advancing means proper. Just past the roller 92 and carried by the lower section of the advancing means are a pair of rollers 328 and 330 which serve to properly guide the leading end of the articles, two adjacent linked or joined articles being indicated by reference characters A and B. The first cycle of severing operation is initiated when the juncture C between the leading and trailing articles A and B is sensed by the finger 264 which drops into the depression and then imediately rides up over the top of the leading end of the trailing article B, substantially as is shown in FIG. 6. As aforesaid, the dropping down of the finger 264 will initiate a reciprocation of the carriage 14 and immediately the knife assembly and particularly the tube 192 will start to drop to pass under the guide shoe 152, eventually resting within the juncture C and then, as aforesaid, the greater velocity of the carriage will force the tube 192 to ride against the trailing end of the leading article A, substantially as is shown in FIG. 4, and when the switch 220 is actuated, the knife 202 will reciprocate to sever the joining region between the leading and trailing articles A and B. The carriage 14 will thereafter commence its return stroke with the knife assembly and the tube 192 being raised to pass over the top of the guide shoe 152 for ultimate disposition in the at rest position preparatory to a further indication by the sensing finger 264 of the proper positioning of the next two articles to be severed.

It is a particular feature of the machine that the sprockets associated with the rollers 88, 90 and 124 have a lesser number of teeth than the remaining sprockets whereby the angular velocity of the several rollers 88, 90 and 124 is slightly greater than the angular velocity of the remaining rollers. This will tend to cause a straightening action since articles such as wieners, sausages and the like will tend to be curved or curled to some extent and the straightening action is beneficial to assure accurate and efficient separation between adjacent joined articles.

I claim:
1. A machine for serving a chain of joined articles into individual links, comprising the combination of
a frame including a main support member,
article advancing means mounted on one side of said main support member, said advancing means including a pair of spaced sections defining an article-receiving channel therebetween,
drive means mounted on said frame and including a pair of drive shafts for respective sections of said advancing means,
said drive shafts being parallel and extending toward said main support member with at least one of the drive shafts being spaced a substantial distance from the main support member,
at least one of said sections of the advancing means being yieldingly mounted on said main support member whereby the width of said channel may increase to accommodate articles passing therethrough,
said one section having an elongate stub shaft projecting therefrom into driven, slip-fitted relation with said one drive shaft, the other section having a stub shaft projecting therefrom into driven, slip-fitted relation with the other drive shaft, said drive means also including a third drive shaft, an actuating shaft and a one-revolution clutch coupling the third drive shaft and actuating shaft, a carriage mounted on said main support member for reciprocation thereon along an intermediate portion of said channel, means connecting said actuating shaft to said carriage for effecting reciprocation of the latter, sensor means mounted on said frame and responsive to the presence of the joined region between adjacent articles to actuate said clutch and initiate reciprocation of said carriage, cutter means mounted on said carriage for severing the joined region between adjacent articles.

2. In a machine for severing a chain of articles into separate links, means for conveying a chain of joined articles along a given course, a carriage assembly reciprocably mounted for movement adjacent and generally parallel to said given course, cutter means mounted on said carriage for movement therewith and for movement relative thereto into article-separating position, drive means for said carriage to impart motion thereto which is initially slower than the velocity of articles moved by said means for conveying and subsequently faster than such velocity, sensor means for actuating the last mentioned means in response to a predetermined instantaneous positioning of adjacent articles along said given course, and means carried by said carriage and operable to actuate said cutter means in response to linear velocity of said carriage which exceeds that of the chain of joined articles as moved by said means for conveying.

3. In a machine for severing a chain of joined articles into individual links, conveying means for confining and conveying a chain of articles along a given course, cutter means mounted alongside said given course and reciprocable longitudinally thereof, said cutter means including a knife member reciprocable transversely of said given course and positioning means upon which said knife member is mounted, means responsive to a predetermined position of adjacent joined articles along said given course for initiating reciprocation of said cutter means to dispose said positioning means in operative disposition between such adjacent joined articles, said cutter means also including a reciprocable carriage upon which said positioning means is mounted, drive means for said carriage to impart motion thereto which is initially slower than the velocity of articles moved by said conveyor means and subsequently faster than such velocity, cam means for preventing operative disposition of said positioning means until the velocity of the carriage at least approaches the aforesaid article-velocity, and actuating means for said knife member responsive to operative disposition of said positioning means.

4. In a machine for severing a chain of joined articles into separate links, means for positively conveying a chain of articles along a given course, a carriage assembly reciprocably mounted for movement alongside said given course, drive means for said carriage assembly including a clutch-actuation shaft, a cross-head guidably mounted for transverse reciprocation on said carriage assembly, a pitman arm on said shaft and a drag link connecting said pitman arm and cross-head, knife means mounted on said carriage assembly including a guide and positioning member projecting laterally of said carriage assembly within said given course and a knife member reciprocably carried by said guide and positioning member, said guide and positioning member being mounted on said carriage assembly for reciprocation transversely thereof, and means actuated by said cross-head for controlling the transverse positioning of said guide and positioning means.

5. A machine for severing linked articles from each other, comprising, a conveyor mechanism for advancing a chain of linked articles, carriage mechanism mounted for cyclic movement back and forth along the path of advancement of the linked articles, knife means carried by said carriage mechanism for severing the region of joining being adjacent linked articles during each cyclic movement of the carriage mechanism, and means responsive to the position of articles along the path of advancement for initiating said cyclic movement of the carriage mechanism, said conveyor mechanism comprising upper and lower sections, each including a plurality of spaced rollers with the rollers of the two sections defining an article-gripping throat therebetween, and means for driving said rollers with those at one end of each section rotating more rapidly than those at the opposite end of each section.

6. A machine for severing linked articles from each other, comprising, a conveyor mechanism for advancing a chain of linked articles, carriage mechanism mounted for cyclic movement back and forth along the path of advancement of the linked articles, knife means carried by said carriage mechanism for severing the region of joining being adjacent linked articles during each cyclic movement of the carriage mechanism, and means responsive to the position of articles along the path of advancement for initiating said cyclic movement of the carriage mechanism, said conveyor mechanism comprising upper and lower sections, each including a plurality of spaced rollers with the rollers of the two sections defining an article-gripping throat therebetween, and means for driving said rollers with those at one end of each section rotating more rapidly than those at the opposite end of each section, said upper and lower sections being spaced apart a distance less than the thickness of articles to be advanced thereby, and one of said sections being resiliently mounted for movement toward and away from the other section.

7. The machine according to claim 6 including a vertical frame plate, said upper and lower conveyor sections being mounted on one side of said vertical frame plate, said carriage mechanism being mounted on the opposite side thereof.

8. The machine according to claim 7 wherein each conveyor section is provided with a stub shaft projecting beyond said frame plate into axial slip-fitted engagement with drive means therefor, said upper and lower sections being detachably connected to said frame plate for removal therefrom in a direction axially of said stub shafts and normal to said frame plate.

9. A machine for severing linked articles from each other, comprising, a conveyor mechanism for advancing a chain of linked articles, carriage mechanism mounted for cyclic movement back and forth along the path of advancement of the linked articles, knife means carried by said carriage mechanism for severing the region of joining being adjacent linked articles during each cyclic movement of the carriage mechanism, means responsive to the position of articles along the path of advancement for initiating said cyclic movement of the carriage mechanism, a vertical frame plate, and said conveyor mechanism including upper and lower sections mounted on one side of said vertical frame plate, said carriage mechanism being mounted on the other side of said frame plate.

said upper and lower sections being detachably connected to said frame plate for removal therefrom in a direction axially of said stub shafts and normal to said frame plate.

10. The machine according to claim 9 wherein said upper and lower sections being spaced apart a distance less than the thickness of articles to be advanced thereby, and one of said sections being resiliently mounted for movement toward and away from the other section.

11. A machine for severing linked articles from each other, comprising, a conveyor mechanism for advancing a chain of linked articles, carriage mechanism mounted for cyclic movement back and forth along the path of advancement of the linked articles, knife means carried by said carriage mechanism for severing the region of joining being adjacent linked articles during each cyclic movement of the carriage mechanisms, and means responsive to the position of articles along the path of advancement for initiating said cyclic movement of the carriage mechanism, the last mentioned means including mechanism for detecting the predetermined position of a region of joining between adjacent joined articles, means for driving said carriage mechanism so that at least one portion of its movement exceeds the linear velocity of the articles being advanced, and said knife means including actuating mechanism therefor responsive to movement of said carriage mechanism faster than the articles being advanced, as aforesaid.

References Cited by the Examiner

UNITED STATES PATENTS

| | | | |
|---|---|---|---|
| 2,463,157 | 3/49 | Deitrickson | 17—1 |
| 2,799,892 | 7/57 | Demarest et al. | 17—1 |

SAMUEL KOREN, *Primary Examiner.*

LUCIE H. LAUDENSLAGER, *Examiner*